(12) United States Patent
Handa et al.

(10) Patent No.: US 7,688,445 B2
(45) Date of Patent: Mar. 30, 2010

(54) SPECTROSCOPE AND SPECTROSCOPIC METHOD

(75) Inventors: Yoichiro Handa, Yokohama (JP); Norihiko Utsunomiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 11/760,337

(22) Filed: Jun. 8, 2007

(65) Prior Publication Data

US 2007/0291266 A1  Dec. 20, 2007

(30) Foreign Application Priority Data

Jun. 15, 2006  (JP) ............... 2006-166150

(51) Int. Cl.
*G01J 3/30* (2006.01)
(52) U.S. Cl. ..................... 356/328; 356/334
(58) Field of Classification Search ............... 356/328, 356/334
See application file for complete search history.

(56) References Cited

U.S. PATENT DOCUMENTS

| 4,340,303 | A | * | 7/1982 | Grisar et al. | ............... 356/313 |
| 4,605,306 | A | * | 8/1986 | Kaffka et al. | ............... 356/334 |
| 4,645,344 | A | * | 2/1987 | Thevenon | ............... 356/328 |
| 5,963,320 | A | * | 10/1999 | Brooks et al. | ............... 356/310 |
| 6,456,688 | B1 | * | 9/2002 | Taguchi et al. | ............... 378/84 |

FOREIGN PATENT DOCUMENTS

| JP | 48-019269 | 6/1973 |
| JP | 57-144429 | 9/1982 |
| JP | 58-131520 | 8/1983 |
| JP | 61-176443 | 11/1986 |
| JP | 02-087028 | 3/1990 |
| JP | 04-009723 | 1/1992 |
| JP | 04-140652 | 5/1992 |
| JP | 05-099863 | 4/1993 |
| JP | 2000-111405 | 4/2000 |

\* cited by examiner

*Primary Examiner*—Kara E Geisel
(74) *Attorney, Agent, or Firm*—Fitzpatrick, Cella, Harper & Scinto

(57) ABSTRACT

A spectroscope of the present invention includes a concave diffraction grating which disperses incident light, an incident light introduction unit which introduces incident light into the concave diffraction grating, and an outgoing light receiving unit which receives outgoing light dispersed for different wavelengths by the concave diffraction grating. The spectroscope further includes an incident aperture which limits an incident angle of light emitted by the incident light introduction unit to the concave diffraction grating, and an outgoing aperture which limits an outgoing angle of outgoing light dispersed for different wavelengths by the concave diffraction grating to the light receiving unit. The spectroscope is constructed so that relatively rotational transfer of at least two out of the concave diffraction grating, the incident aperture and the outgoing apertures can be performed along a Rowland circle which the concave diffraction grating forms.

3 Claims, 6 Drawing Sheets

SPECTROSCOPE AND SPECTROSCOPIC METHOD

BACKGROUND OF THE INVENTION

1. Field of the Invention

The present invention relates to a spectroscope and spectroscopic method used to measure the spectral characteristics of a sample.

2. Description of the Related Art

Many conventional spectroscopes use a diffraction grating, and construction as illustrated in FIG. 7 is mainly adopted.

Light from a light source 101 is limited by an entrance slit 102, and is incident into a diffraction grating 103 which is rotatable. The light incident into the diffraction grating 103 is diffracted to different angles for different wavelengths. Only the light on a specific wavelength passes an outgoing slit 104. Then, the light is condensed by a condenser lens 105 and is incident into a detector 106. In a spectroscope with such construction, since a wavelength of passing the outgoing slit 104 changes by rotating the diffraction grating 103, spectrometry can be performed.

In addition, spectrometry can be performed without rotating a diffraction grating 203 by adopting construction illustrated in FIG. 8. Since a diode array is used for a detector 204 in the construction of FIG. 8, spectrometry can be performed by acquiring measurement data corresponding to each wavelength by each diode.

When rotating a diffraction grating with such construction as illustrated in FIG. 7, accuracy of angle control of a rotation angle affects accuracy of spectrometry greatly. Then, in order to raise measurement wavelength accuracy, Japanese Patent Application Laid-Open No. H07-198487 proposes a spectroscope which has a spectroscope body in which positional relation between a light source and a diffraction grating is fixed, a detecting unit provided outside the spectroscope body, and a rotational transfer mechanism which performs rotational transfer of the spectroscope body and the detecting unit relatively. According to the spectroscope of Japanese Patent Application Laid-Open No. H07-198487, a spectrum can be performed without rotating a diffraction grating itself.

In addition, there is a Rowland circle which touches internally at a center of a diffraction grating made into concavity, and whose diameter is a curvature radius of the concave diffraction grating. When a slit is put on an arbitrary point on the Rowland circle, light is incident, and diffraction is caused by the concave diffraction grating, a spectrum without a chromatic aberration is imaged on the Rowland circle.

Also when rotational transfer of a spectroscope body, in which positional relation of a diffraction grating and a light source is fixed, and a detector is performed relatively like the spectroscope of Japanese Patent Application Laid-Open No. H07-198487, and also when rotational transfer of an outgoing slit on a Rowland circle is performed, it is able to enhance accuracy of a wavelength to be measured. However, since only the outgoing slit operates relatively, a position of the outgoing slit where diffraction efficiency becomes maximum is achieved only on a specific wavelength. Thus, since intensity of light which passes the outgoing slit has wavelength dispersion, depending on a wavelength, a noise component in light intensity becomes large, and there arises an issue that spectrum accuracy reduces.

SUMMARY OF THE INVENTION

Then, the present invention aims at providing a spectroscope and a spectroscopic method which can perform a highly accurate spectrum.

The present invention is directed to a spectroscope which has a concave diffraction grating which disperses incident light for different wavelengths, an incident light introduction unit which introduces incident light into the concave diffraction grating, and an outgoing light receiving unit which receives outgoing light dispersed for different wavelengths by the concave diffraction grating, the spectroscope comprising:

an incident aperture which limits an incident angle of light emitted by the incident light introduction unit to the concave diffraction grating; and an outgoing aperture which limits an outgoing angle of outgoing light dispersed for every wavelengths by the concave diffraction grating to the outgoing light receiving unit, wherein the spectroscope is constructed so that relatively rotational transfers of at least two selected from the group consisting of the concave diffraction grating, the incident aperture and the outgoing aperture can be performed along a Rowland circle formed by the concave diffraction grating so as to arrange the incidence aperture and the outgoing aperture in a position of maximum diffraction efficiency of the concave diffraction grating on a wavelength of measuring.

The present invention is directed to a spectroscopic method using a spectroscope which has a concave diffraction grating which disperses incident light for different wavelengths, an incident light introduction unit which introduces incident light into the concave diffraction grating, and an outgoing light receiving unit which receives outgoing light dispersed for different wavelengths by the concave diffraction grating, wherein relatively rotational transfers of at least two selected from the group consisting of the concave diffraction grating, an incident aperture which limits an incident angle of light emitted by the incident light introduction unit to the concave diffraction grating and an outgoing aperture which limits an outgoing angle of outgoing light dispersed for every wavelengths by the diffraction grating to the outgoing light receiving unit are performed along a Rowland circle formed by the concave diffraction grating so as to arrange the incident aperture and the outgoing aperture in a position of maximum diffraction efficiency of the concave diffraction grating on a wavelength of measuring.

Further features of the present invention will become apparent from the following description of exemplary embodiments with reference to the attached drawings.

DESCRIPTION OF THE EMBODIMENTS

Figure 1:
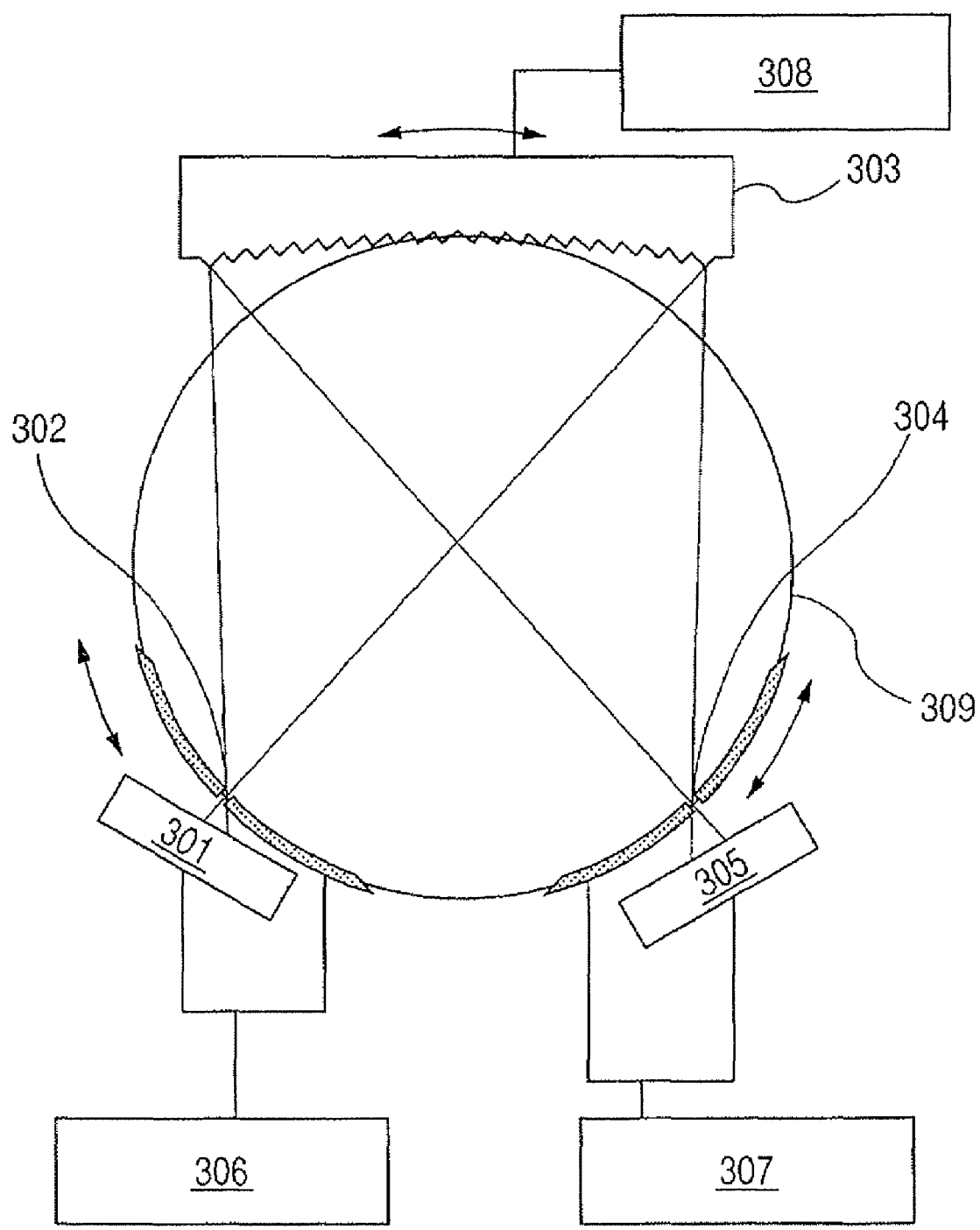
FIG. 1 is a schematic structural diagram illustrating a spectroscope according to one embodiment of the present invention.

With reference to FIG. 1, a spectroscope according to an embodiment of the present invention will be described in detail.

The spectroscope of this embodiment has an incident light introduction unit 301 which emits light, an incident aperture 302 which limits an incident angle of light, emitted from the incident light introduction unit 301, to a concave diffraction grating 303, and the concave diffraction grating 303 which disperses the light, which passes the incident aperture 302, for different wavelengths. This spectroscope further includes an outgoing aperture 304 which limits an outgoing angle of light, which a spectrum wavelength was selected by the concave diffraction grating 303, to an outgoing light receiving unit 305, and the outgoing light receiving unit 305 which receives the light which passes the outgoing aperture 304. The incident aperture 302 and the outgoing aperture 304 are arranged on a Rowland circle 309 of the concave diffraction grating 303, respectively. The spectroscope includes a mechanism which rotates an incident light optical system 306 which performs rotational transfer of the incident light introduction unit 301 and the incident aperture 302 along the Rowland circle 309, and a mechanism which rotates a detecting light optical system 307 which performs rotational transfer of the outgoing light receiving unit 305 and the outgoing aperture 304 along the Rowland circle 309. The spectroscope includes also a mechanism which rotates a diffraction grating 308 which performs rotational transfer of the concave diffraction grating 303 along the Rowland circle 309.

According to the spectroscope of this embodiment constructed as described above, an incident angle into the concave diffraction grating 303 through the incident aperture 302 is limited, and light emitted from the incident light introduction unit 301 is incident into the concave diffraction grating 303. The light incident into the concave diffraction grating 303 is diffracted by the concave diffraction grating 303, and proceeds to the outgoing aperture 304. Light in a specific wavelength range according to arrangement relation among the concave diffraction grating 303, the incident aperture 302, and the outgoing aperture 304 is taken out from the outgoing aperture 304. At this time, a center of a diffraction surface of the concave diffraction grating 303, the incident aperture 302, and the outgoing aperture 304 are arranged on the Rowland circle 309 of the concave diffraction grating 303. Furthermore, the incident aperture 302 and the outgoing aperture 304 are always arranged in a position of becoming a position of maximum diffraction efficiency of the diffraction grating 303. Thereby, light intensity of a wavelength spectrum which passes the outgoing aperture 304 is raised. Optical characteristics of a specific wavelength range can be measured by receiving the light passing the outgoing aperture 304 by the outgoing light receiving unit 305 installed in the internal or external of the spectroscope.

Here, the "position of maximum diffraction efficiency" will be described.

Figure 2:
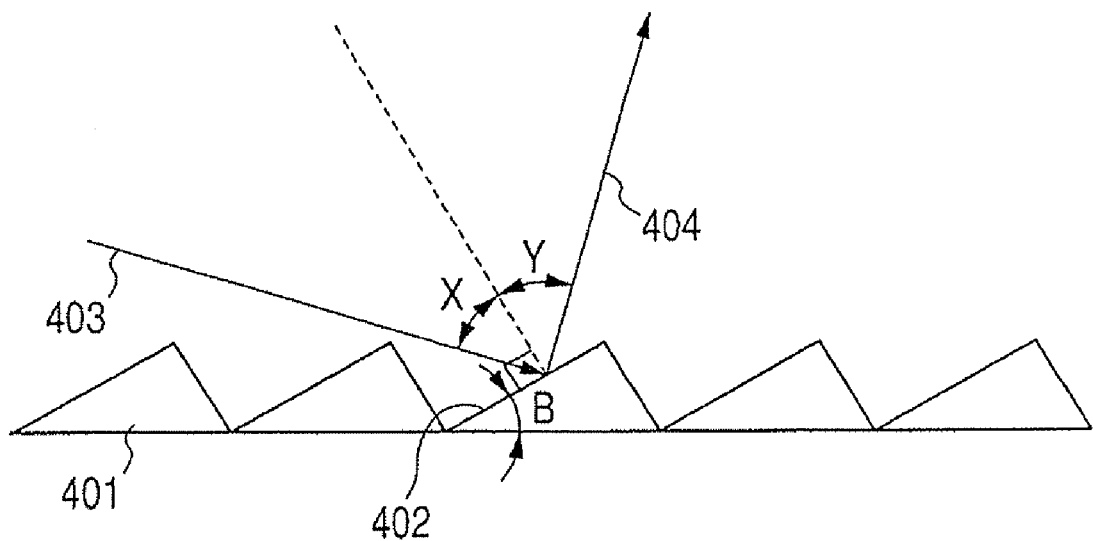
FIG. 2 is a drawing for describing a position of maximum diffraction efficiency.

Generally, in a diffraction grating, there is a position where diffraction efficiency becomes maximum, regardless of a shape. As an example of groove shape, a diffraction grating 401 that a sectional shape of a groove is saw-tooth appearance will be described using FIG. 2. In FIG. 2, when incident light 403 and diffracted light 404 have relation (X=Y) of specular reflection to a slope 402 of the groove, a large portion of energy concentrates on the diffracted light 404. In the present invention, it is defined that timing when the incident light 403 and the diffracted light 404 have this positional relation is the "position of maximum diffraction efficiency." By the way, an angle of an inclination of a groove is called a blaze angle (B).

The position of maximum diffraction efficiency changes with a wavelength of incident light. In order to make the outgoing aperture 304 be always in the position of maximum diffraction efficiency, it is effective to perform rotational transfer of the incident aperture 302, the outgoing aperture 304, and the concave diffraction grating 303 relatively using the mechanism which rotates an incident light optical system 306, the mechanism which rotates a detecting light optical system 307, and the mechanism which rotates a diffraction grating 308, respectively. This enables to perform highly accurate spectrometry. In addition, since what is necessary is just to perform rotational transfer of the incident aperture 302, the outgoing aperture 304, and the concave diffraction grating 303 relatively along the Rowland circle 309, spectrometry is possible even if one of these is fixed and the other two are given rotational transfer.

Figure 3:
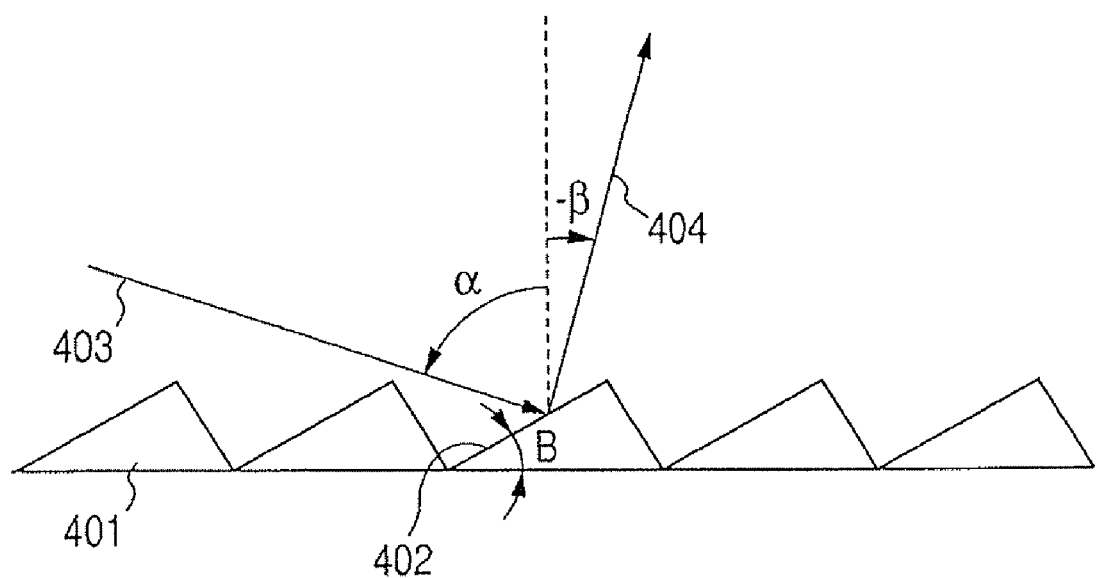
FIG. 3 is a drawing for describing a position of a blaze wavelength.

Here, regarding a diffraction grating with a saw-tooth groove, positional relation between incident light and diffracted light in the "position of maximum diffraction efficiency" will be described using FIG. 3 and the following expressions.

Let an angle formed by a normal line of the diffraction grating with a saw-tooth groove, and incident light be α, and let an angle formed by the normal line and diffracted light be β (where, counterclockwise rotation of these angles (α, β) in the figure are defined to be positive), and the following formula holds from a grating equation:

$$\sin(\alpha)+\sin(\beta)=Nm\lambda \qquad (1)$$

Where, N denotes the number of grooves per unit length, and m denotes the order of diffracted light. In addition, let a blaze angle be B, and the following formula holds:

$$B = \frac{\alpha + \beta}{2} \qquad (2)$$

Energy of a wavelength λ concentrates in a traveling direction of diffracted light as mentioned above. The wavelength at this time is a blaze wavelength, and is defined to be "λB." (In addition, although it is general to call a blaze wavelength a wavelength which energy concentrates in the case of such arrangement (Littrow arrangement) that it was made for plus primary diffracted light to return in a direction of the incident light, in the present invention, words called the blaze wavelength are used in wider meaning.)

By substituting Formula (2) for Formula (1), the following formula is obtained:

$$\lambda_B = \frac{2}{Nm} \mathrm{Sin} B * \mathrm{Cos}(\alpha - B) \qquad (3)$$

In the case of spectrometry, relation of the "position of maximum diffraction efficiency" is always maintained by adjusting α and β on each wavelength so that Formula (3) may be fulfilled.

The incident light introduction unit 301, the diffraction grating 303, the incident aperture 302 and the outgoing aperture 304, and the outgoing light receiving unit 305 which construct the spectroscope of this embodiment will be below described.

(Incident Light Introduction Unit)

Although light sources, such as a halogen lamp, a tungsten lamp, a xenon arc lamp, an LED, and a laser, can be fundamentally used as the incident light introduction unit 301, fluorescence or chemiluminescence by which a sample itself for spectrometry emits light may be used. When spectrometry of a wide wavelength region is performed, although depending also on a target wavelength band, it is suitable to use a light source which can emit light in a broadband such as a halogen lamp, a tungsten lamp, or a xenon arc lamp.

(Diffraction Grating)

Figure 4A:
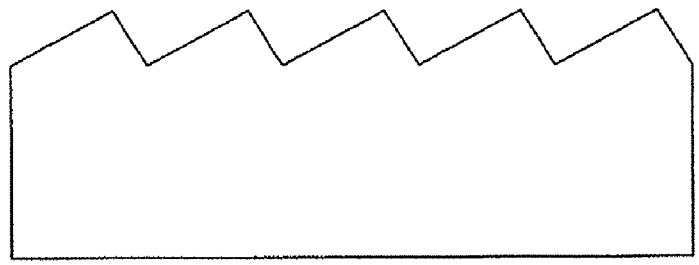
FIGS. 4A, 4B and 4C are drawings for describing diffraction grating types.
Figure 4B:
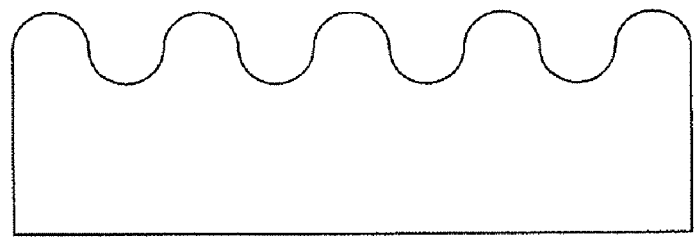
Figure 4C:
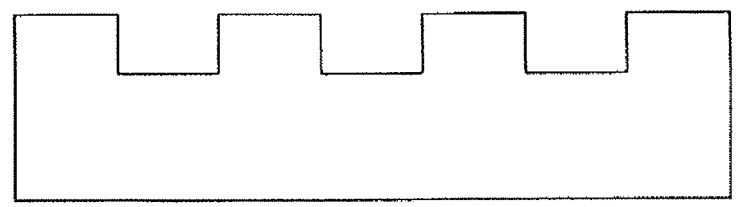

Although a diffraction grating is roughly classified into two types of a plane diffraction grating and a concave diffraction grating, a type of a concave diffraction grating is used in the present invention. In addition, a groove shape of a diffraction grating is finely classified into a saw-tooth groove, a sinusoidal groove, a rectangular groove, and the like which are illustrated in FIGS. 4A, 4B and 4C. But, although any one having the above-mentioned shapes can be used so long as it is what can disperse incident light as the diffraction grating 303 of this embodiment, a saw-tooth type concave diffraction grating is suitable.

(Incident Aperture and Outgoing Aperture)

Although the incident aperture 302 and the outgoing aperture 304 include pores, slits, or the like respectively, it is suitable that size of apertures is small so as to increase accuracy of a measured wavelength. In addition, the incident aperture 302 and the incident light introduction unit 301, and the outgoing aperture 304 and the outgoing light receiving unit 305 may be constructed so that they may integrally move respectively.

(Outgoing Light Receiving Unit)

As long as the outgoing light receiving unit 305 contains a device which receives light passing the outgoing aperture 304, any one may be sufficient. But a device whose light-receiving sensitivity characteristic is constant in a measurement wavelength range is suitable. What includes a light-receiving element which includes a silicone diode when it is a visible region, or which includes a compound semiconductor such as InGaAs when it is a near-infrared region is suitable.

In addition, a waveguide unit for guiding outgoing light to the outgoing light receiving unit 305 may be provided in at least a part between the outgoing slit 604 and the outgoing light receiving unit 305. As the waveguide unit, what guides intensity of outgoing light to the outgoing light receiving unit 305 efficiently is suitable. For example, a waveguide unit to have a waveguide which includes a core layer and a cladding layer is suitable. In addition, it is further suitable to use an optical fiber as the waveguide unit.

EXAMPLES

Examples of the present invention will be described below. Nevertheless, these do not limit a scope of the present invention.

First Example

This example describes a case where spectrometry of a sample is performed without moving a sample stage and a detector.

<Construction>

Figure 5:
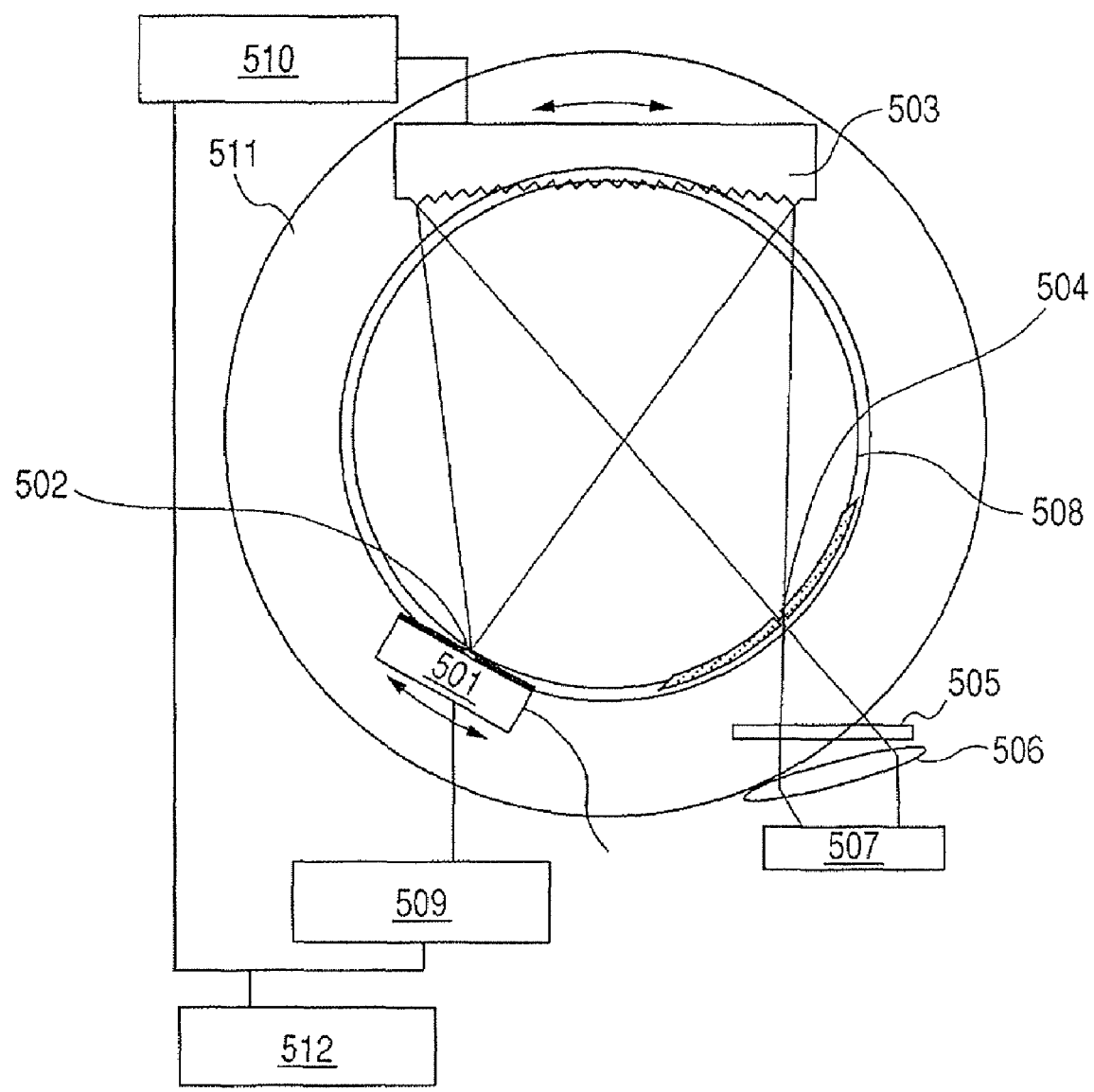
FIG. 5 is a schematic diagram illustrating construction of a spectroscope according to a first example of the present invention.

FIG. 5 is a schematic diagram illustrating construction of a spectroscope according to a first example of the present invention.

The spectroscope of this example includes a halogen lamp 501 as a light source equipped with an entrance slit 502, a reflection type concave diffraction grating (hereafter, this is describes simply as a "concave diffraction grating") 503 which disperses incident light, and an outgoing slit 504 which takes out light on a specific wavelength out of diffracted light dispersed by the concave diffraction grating 503. This spectroscope further includes a sample stage 505 on which a sample which will be given spectrometry is placed, a condenser lens 506 which condenses light which passes the outgoing slit 504, and a detector 507 which detects the light condensed by the condenser lens 506. The spectroscope includes also a halogen lamp rotating unit 509 which performs rotational transfer of an integral object of the halogen lamp 501 and the entrance slit 502 along a Rowland circle 508 of the concave diffraction grating 503, and a diffraction grating rotating unit 510 which performs rotational transfer of the concave diffraction grating 503 along the Rowland circle 508. The spectroscope includes a control unit 512 which controls these rotating units 509 and 510. The spectroscope includes a rail 511 for rotational transfer for performing rotational transfer of the halogen lamp 501 and the concave diffraction grating 503 along the Rowland circle 508.

<Spectrometry>

Light emitted from the halogen lamp 501 is incident into the concave diffraction grating 503 with its incident angle into the concave diffraction grating 503 being limited by the entrance slit 502 attached to the halogen lamp 501. Although the light diffracted by the concave diffraction grating 503 proceeds toward the outgoing slit 504, a wavelength of the light passing the outgoing slit 504 is limited by positional relation between the concave diffraction grating 503 and the outgoing slit 504. Only the light passing the outgoing slit 504 irradiates the sample stage 505, and is condensed by the condenser lens 506 to be received by the detector 507. In addition, a photodiode is used for the detector.

When performing spectrometry of the sample on the sample stage 505, the halogen lamp 501 and the concave diffraction grating 503 are given rotational transfer along the Rowland circle 508 using the halogen lamp rotating unit 509 and the diffraction grating rotating unit 510, respectively. Thereby, a wavelength which is made to pass the outgoing slit 504 can be changed. In addition, the halogen lamp 501 and the concave diffraction grating 503 can always move along the Rowland circle 508 by moving on the rail 511 for rotational transfer. Furthermore, without using the rail 511 for rotational transfer, the same spectrometry can be also performed by using a mechanism of rotating the halogen lamp 501 and the concave diffraction grating 503 with an arm with making the center of the Rowland circle 508 a rotary shaft. The control unit 512 performs rotation control of the halogen lamp 501 and the concave diffraction grating 503 in the spectrometry.

Second Example

In this example, a case where spectrometry of a sample is performed without moving a diffraction grating and an incident light source will be described.

<Construction>

Figure 6:
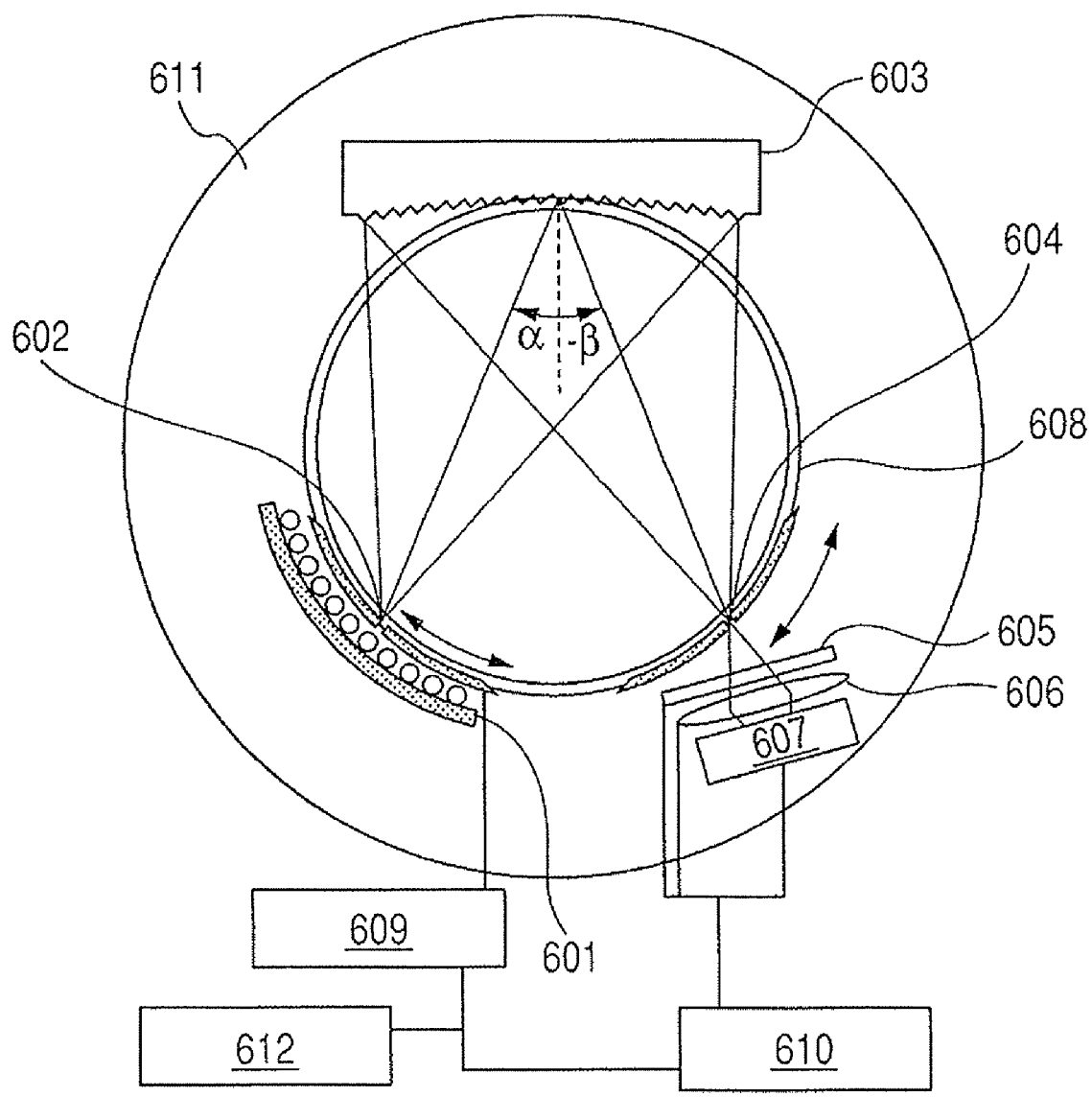
FIG. 6 is a schematic diagram illustrating construction of a spectroscope according to a second example of the present invention.
Figure 7:
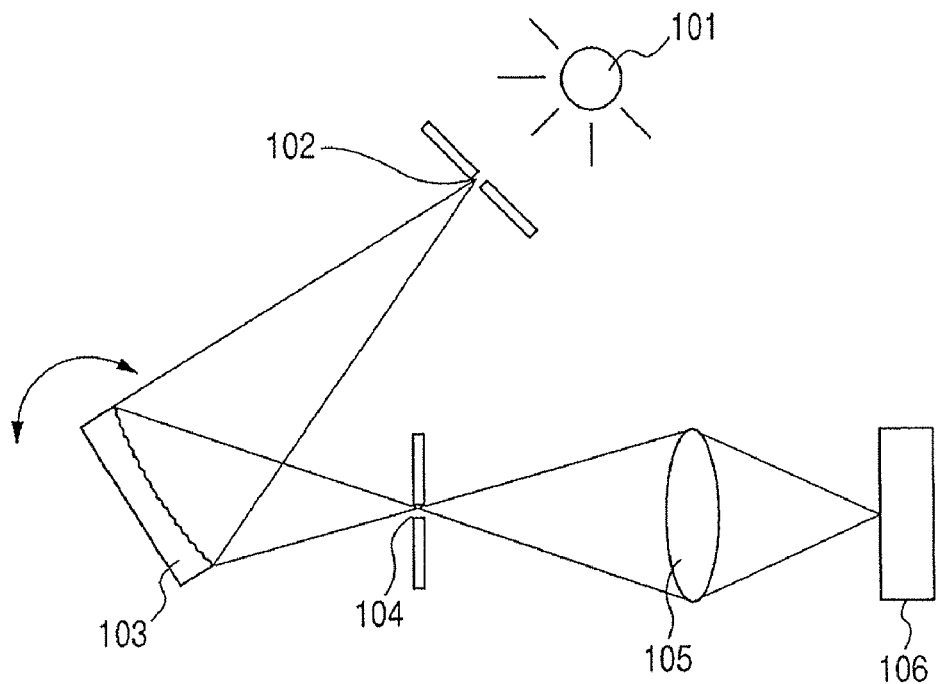
FIG. 7 is a diagram illustrating construction of a conventional spectroscope.
Figure 8:
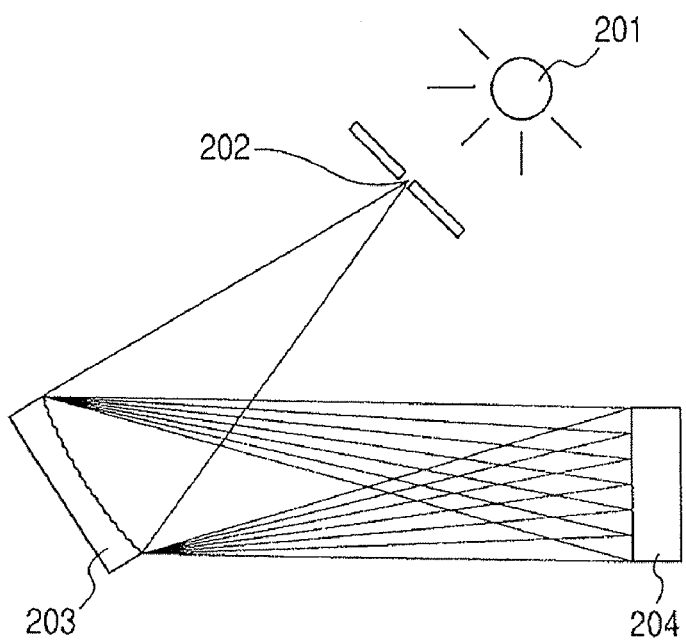
FIG. 8 is a diagram illustrating construction of another conventional spectroscope.

FIG. 6 is a schematic diagram illustrating construction of a spectroscope according to a second example of the present invention.

The spectroscope of this example includes a white LED array 601 as a light source, an entrance slit 602 which limits an incident angle of light from the white LED array 601, and a reflection type concave diffraction grating (hereafter, this is described as a "concave diffraction grating") 603 which disperses the light passing the entrance slit 602. In addition, this concave diffraction grating 603 has 1000 grooves per mm and has a blaze angle of 30°. This spectroscope further includes an outgoing slit 604 which takes out the diffracted light dispersed by the concave diffraction grating 603, a sample stage 605 on which a sample to which spectrometry is given is placed, and a condenser lens 606 which condenses the light passing the outgoing slit 604. The spectroscope further includes a detector 607 which detects the light condensed by the condenser lens 606.

The spectroscope includes an entrance slit rotating unit 609 which performs rotational transfer of the entrance slit 602 along a Rowland circle 608 of the concave diffraction grating 603. The spectroscope includes also a light receiving optical system rotating unit 610 which performs rotational transfer of light receiving optical system including the outgoing slit 604, the sample stage 605, the condenser lens 606, and the detector 607 along the Rowland circle 608. The spectroscope includes a control unit 612 which controls these rotating units 609 and 610. The spectroscope includes a rail 611 for rotational transfer for performing rotational transfer of the entrance slit 602 and the light receiving optical system 604 to 607 along the Rowland circle 608.

<Spectrometry>

Light emitted from one LED of the white LED array 601 is incident into the concave diffraction grating 603 with its incident angle into the concave diffraction grating 603 being limited by the entrance slit 602. Although the light diffracted by the concave diffraction grating 603 proceeds toward the outgoing slit 604, similarly to the first example, a wavelength of the light passing the outgoing slit 604 is limited by positional relation between the concave diffraction grating 603 and the outgoing slit 604. For example, with letting an angle α formed by a normal line of the concave diffraction grating 603 and the incident light into the concave diffraction grating 603 be 83.13°, and letting an angle β formed by a normal line of the concave diffraction grating 603 and the diffracted light be −23.13°, light on a wavelength of 600 nm can be measured most efficiently. In addition, in this figure, since positional relation is different from that in FIG. 3, clockwise rotation of α and β is made positive. In addition, by changing α to 75.57° and β to −15.57°, light on a wavelength of 700 nm can be measured most efficiently. By changing α and β in this way, the position of maximum diffraction efficiency can be always maintained, and spectrometry can be performed. Only the light passing the outgoing slit 604 irradiates the sample stage 605, and is condensed by the condenser lens 606 to be received by the detector 607. In addition, in this example, since LEDs whose light intensity is comparatively small are used for the light source, a photomultiplier tube with high light-receiving sensitivity is used for the detector 607.

When performing spectrometry of a sample on the sample stage 605, rotational transfer of the entrance slit 602 and the light receiving optical system 604 to 607 along the Rowland circle 608 is performed using the entrance slit rotating unit 609 and the light receiving optical system rotating unit 610, respectively. Thereby, a wavelength which is made to pass the outgoing slit 604 can be changed. The entrance slit 602 and the light receiving optical system 604 to 607 can always move on the Rowland circle 608 by moving on the rail 611 for rotational transfer. In addition, similarly to the first example, without using the rail 611 for rotational transfer, the same spectrometry can be also performed by using a mechanism of rotating the entrance slit 602 and the light receiving optical system 604 to 607 with an arm with making the center of the Rowland circle 608 a rotary shaft. The control unit 612 performs rotation control of the entrance slit 602 and the light receiving optical system 604 to 607 in spectrometry.

According to the above-mentioned exemplary examples of the present invention, highly accurate spectrum can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-166, filed Jun. 15, 2006, which is hereby incorporated by reference herein in its entirety.

What is claimed is:

1. A spectroscope which has a concave diffraction grating which disperses incident light for different wavelengths, an incident light introduction unit which introduces incident light into the concave diffraction grating, and an outgoing light receiving unit which receives outgoing light dispersed for different wavelengths by the concave diffraction grating, the spectroscope comprising:

an incident aperture which limits an incident angle of light emitted by the incident light introduction unit to the concave diffraction grating; and an outgoing aperture which limits an outgoing angle of outgoing light dispersed for every wavelength by the concave diffraction grating to the outgoing light receiving unit, wherein the spectroscope is constructed so that relatively rotational transfers of at least two selected from the group consisting of the concave diffraction grating, the incident aperture and the outgoing aperture can be performed along a Rowland circle formed by the concave diffraction grating so as to arrange the incident aperture and the outgoing aperture in a position of maximum diffraction efficiency of the concave diffraction grating on a wavelength of measuring.

2. A spectroscopic method using a spectroscope which has a concave diffraction grating which disperses incident light for different wavelengths, an incident light introduction unit which introduces incident light into the concave diffraction grating, and an outgoing light receiving unit which receives outgoing light dispersed for different wavelengths by the concave diffraction grating, the method comprising:

performing relatively rotational transfers of at least two selected from the group consisting of the concave diffraction grating, an incident aperture which limits an incident angle of light emitted by the incident light introduction unit to the concave diffraction grating and an outgoing aperture which limits an outgoing angle of outgoing light dispersed for every wavelength by the concave diffraction grating to the outgoing light receiving unit along a Rowland circle formed by the concave diffraction grating so as to arrange the incident aperture and the outgoing aperture in a position of maximum diffraction efficiency of the concave diffraction grating on a wavelength of measuring.

3. The spectroscopic method according to claim 2, wherein the concave diffraction grating is in the shape of a saw-tooth, satisfying the following equation:

$$\lambda_B = \frac{2}{Nm} \sin B * \cos(\alpha - \beta)$$

wherein $\lambda_B$ denotes a blaze wavelength, B denotes the blaze angle, $\alpha$ denotes an angle formed by a normal line of the diffraction grating with a saw-tooth groove and incident light, $\beta$ denotes an angle formed by the normal line and diffracted light, N denotes the number of grooves per unit length, and m denotes the order of diffracted light.

* * * * *